(12) United States Patent
Hoff

(10) Patent No.: US 8,240,083 B2
(45) Date of Patent: Aug. 14, 2012

(54) PLANT AID, WATER COLLECTION SHEET AND METHOD

(75) Inventor: Petrus Mattheus Maria Hoff, Roosendaal (NL)

(73) Assignee: P.M.M. Hoff Holding B.V., Steenbergen (NL)

( * ) Notice: Subject to any disclaimer, the term of this patent is extended or adjusted under 35 U.S.C. 154(b) by 611 days.

(21) Appl. No.: 11/916,851

(22) PCT Filed: Jun. 8, 2006

(86) PCT No.: PCT/NL2006/000282
§ 371 (c)(1),
(2), (4) Date: Feb. 25, 2008

(87) PCT Pub. No.: WO2006/132526
PCT Pub. Date: Dec. 14, 2006

(65) Prior Publication Data
US 2008/0190017 A1    Aug. 14, 2008

(30) Foreign Application Priority Data

Jun. 8, 2005 (NL) .................................... 1029216
Jun. 21, 2005 (NL) .................................... 1029307

(51) Int. Cl.
*A01G 9/02* (2006.01)

(52) U.S. Cl. .......................................... 47/79; 47/65.5

(58) Field of Classification Search ............... 47/21.1, 47/29.7, 30, 31.1, 32, 40.5, 58.1 R, 59 R, 47/62 R, 62 C, 63, 66, 66.6, 66.7, 79, 82, 47/48.5
See application file for complete search history.

(56) References Cited

U.S. PATENT DOCUMENTS

| 1,231,976 | A | * | 7/1917 | Weitzel | 137/432 |
| 1,773,020 | A | * | 8/1930 | Willis | 47/79 |
| 2,431,890 | A | * | 12/1947 | Raines | 47/62 A |
| 3,534,498 | A | * | 10/1970 | Herrli | 47/81 |
| 3,618,260 | A | * | 11/1971 | Convey, Jr. et al. | 47/32 |
| 3,755,965 | A | * | 9/1973 | Emery | 47/48.5 |
| 3,856,205 | A | * | 12/1974 | Rohling | 239/63 |
| 3,915,419 | A | * | 10/1975 | Brown et al. | 248/318 |

(Continued)

FOREIGN PATENT DOCUMENTS

CN    2471707 Y    1/2002

(Continued)

OTHER PUBLICATIONS

Nelson (2003) http://www.rexresearch.com/airwells/airwells.htm, "Air Wells, Fog Fences and Dew Ponds Methods for Recovery of Atmospheric Humidity".

(Continued)

*Primary Examiner* — Rob Swiatek
*Assistant Examiner* — Danielle Clerkley
(74) *Attorney, Agent, or Firm* — Swanson & Bratschun, L.L.C.

(57) ABSTRACT

The invention relates to a plant aid for surrounding a young plant. The plant aid comprises a tube at least partly sideways surrounding a young plant placeable in the plant aid. The plant aid further comprises a water collection sheet for collecting moisture present in the atmosphere. The water collection sheet comprises a water collection surface comprising a receiving surface, which receiving surface operatively makes a first angle with respect to the orientation of gravity. The water collection sheet further comprises a collecting surface adjoining a lower edge of the receiving surface, which collecting surface operatively makes a second angle with respect to the orientation of gravity. The first angle is smaller than the second angle.

33 Claims, 14 Drawing Sheets

U.S. PATENT DOCUMENTS

| | | | | |
|---|---|---|---|---|
| 4,087,938 | A | * | 5/1978 | Koch ............................. 47/48.5 |
| 4,135,599 | A | | 1/1979 | Fair |
| 4,745,707 | A | * | 5/1988 | Newby ............................... 47/79 |
| 4,885,870 | A | * | 12/1989 | Fong .................................. 47/79 |
| 4,952,229 | A | * | 8/1990 | Muir ................................... 71/7 |
| 5,117,584 | A | * | 6/1992 | Ottenwalder et al. ............. 47/72 |
| 5,279,070 | A | * | 1/1994 | Shreckhise et al. ............... 47/39 |
| 5,299,384 | A | * | 4/1994 | Andrews ........................ 47/66.5 |
| 5,315,783 | A | * | 5/1994 | Peng ............................. 47/65.6 |
| 5,549,277 | A | * | 8/1996 | Franz ............................ 251/223 |
| D384,006 | S | * | 9/1997 | Weder et al. ................. D11/164 |
| D388,019 | S | * | 12/1997 | Weder et al. ................. D11/164 |
| 5,992,088 | A | * | 11/1999 | Henningsson et al. ........ 47/22.1 |
| 6,418,663 | B1 | * | 7/2002 | Smith ............................... 47/79 |
| 6,976,334 | B1 | * | 12/2005 | Bowditch .......................... 47/32 |
| 7,171,783 | B1 | * | 2/2007 | Fidotti .............................. 47/81 |
| 2007/0022660 | A1 | * | 2/2007 | Buitendag et al. ................ 47/81 |
| 2007/0062114 | A1 | | 3/2007 | Kruer |

FOREIGN PATENT DOCUMENTS

| | | |
|---|---|---|
| GB | 1 603 661 | 11/1981 |
| GB | 2 230 929 | 11/1990 |
| GB | 723239 | 2/1995 |
| OA | 11 356 | 12/2003 |
| WO | WO/00/00015 | 1/2000 |
| WO | WO/2004/029372 | 4/2004 |
| WO | WO 2006/132526 | 12/2006 |

OTHER PUBLICATIONS

International Search Report from PCT/NL2008/050816, dated Mar. 17, 2009.

* cited by examiner

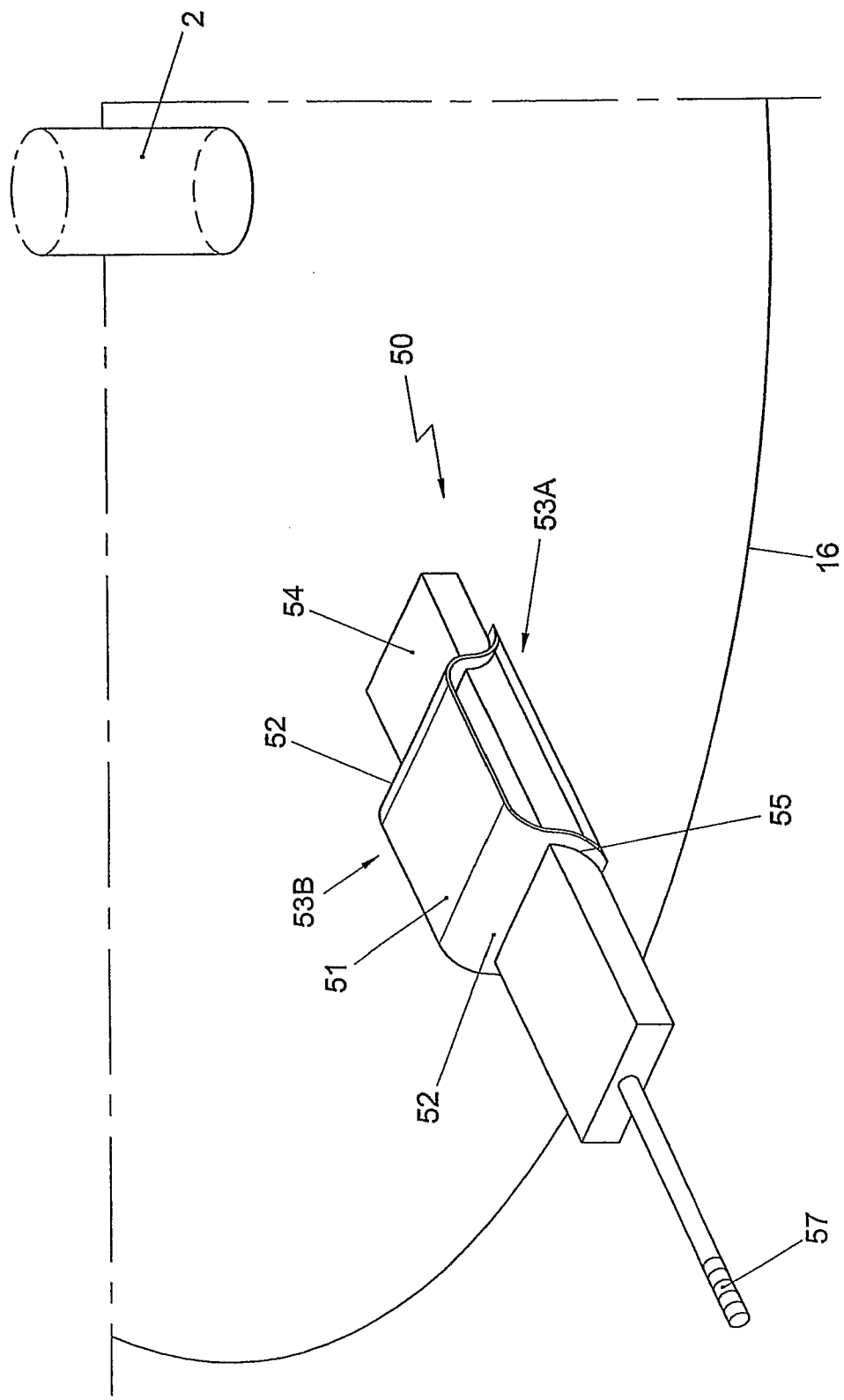

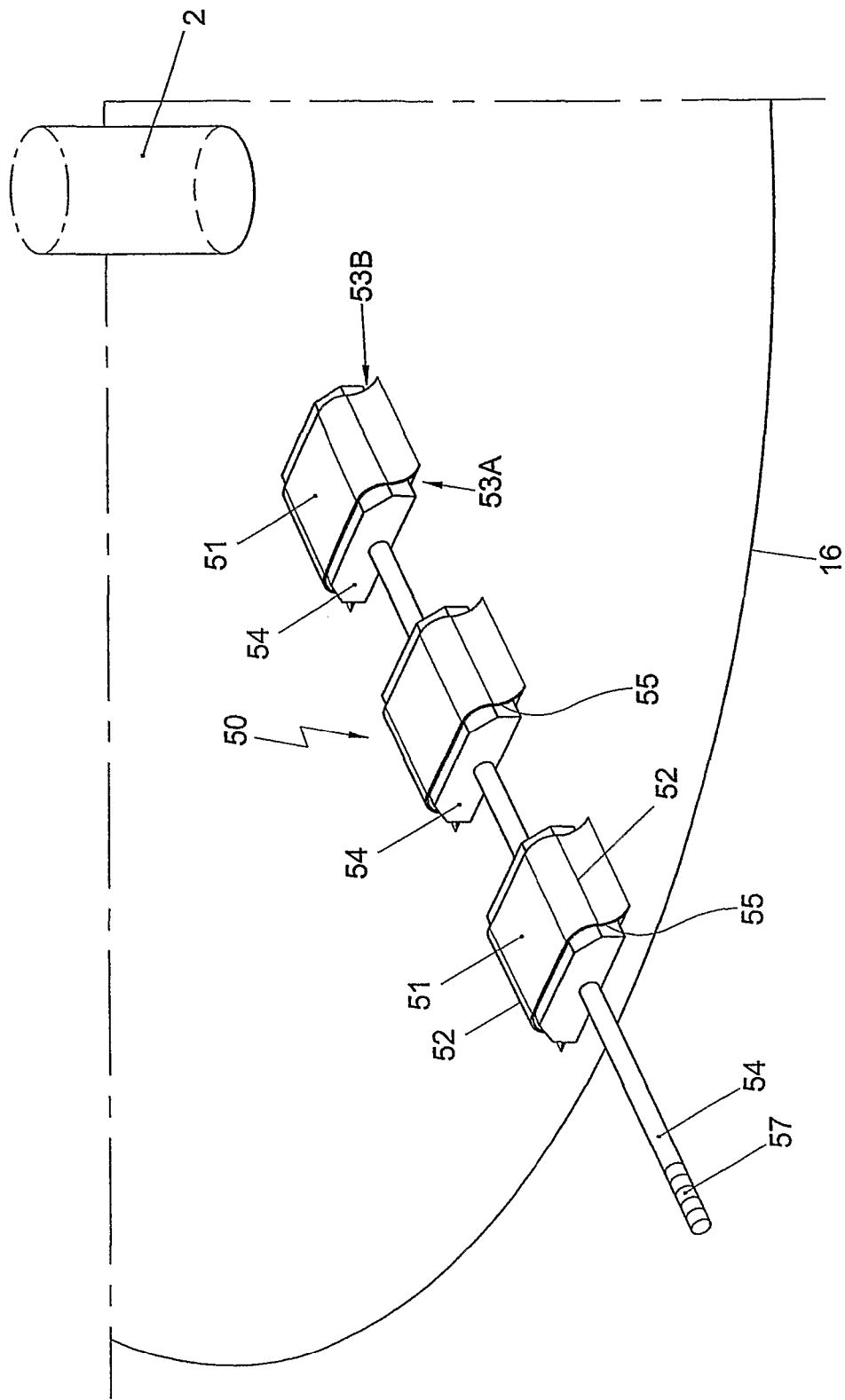
Fig. 11B1

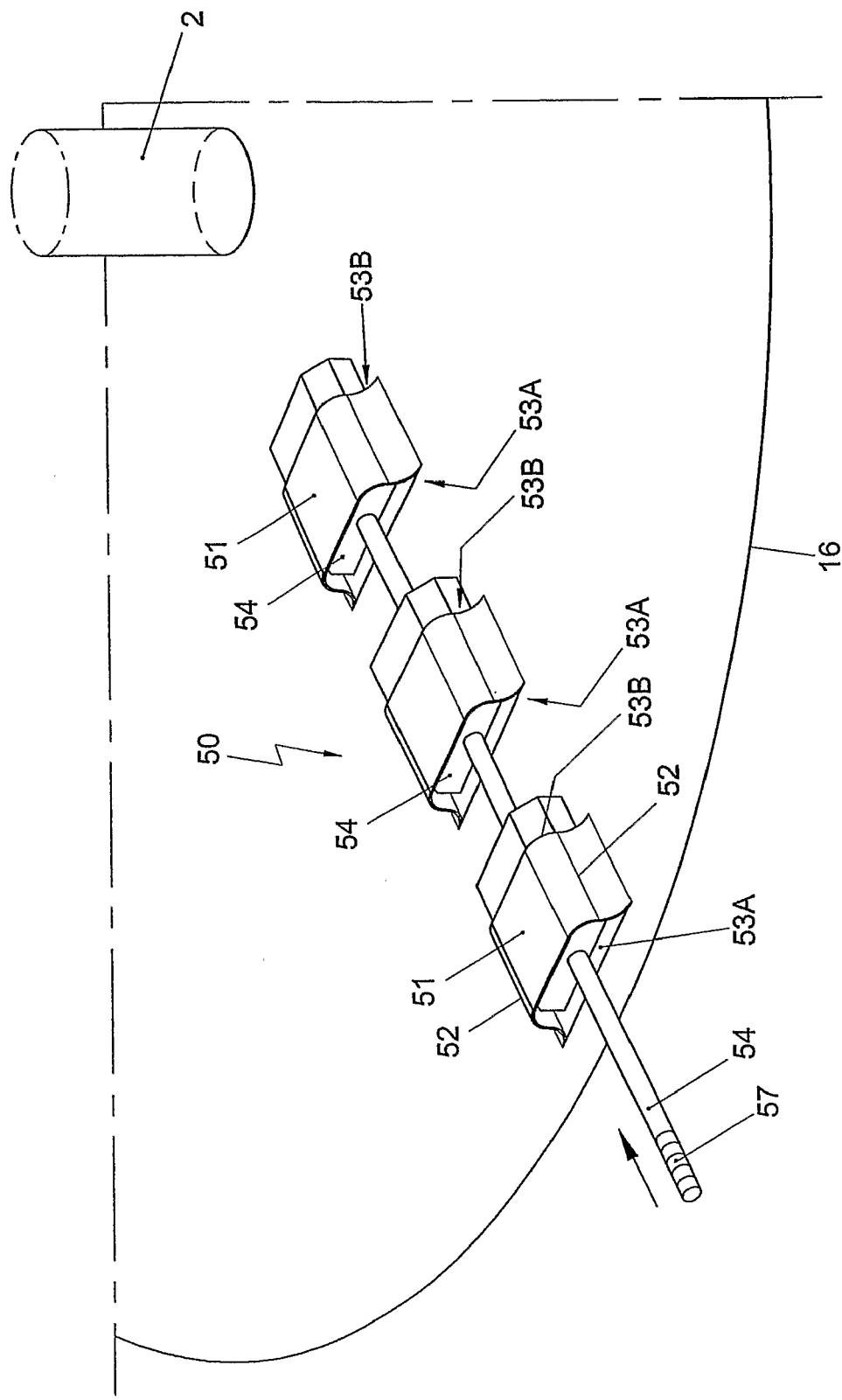
Fig. 11B2

PLANT AID, WATER COLLECTION SHEET AND METHOD

RELATED APPLICATIONS

This application is a 35 U.S.C. §371 national phase application of PCT/NL2006/000282 (WO 2006/000282), filed on Jun. 8, 2006, entitled "Plant Aid, Water Collection Sheet and Method", which application claims the benefit of Netherlands Application Serial Nos. NL1029216, filed Jun. 8, 2005 and NL1029307, filed Jun. 21, 2005, each of which is incorporated herein by reference in its entirety.

The invention relates to a plant aid for protecting a young plant, comprising a tube at least partly sideways surrounding a young plant placeable in the plant aid.

Such a plant aid is, for instance, known from international patent publication WO 0000015 for protecting young plants during afforestation.

After planting young plants, losses often occur due to lack of moisture. This is because the young plant has no or hardly any root structures which are able to absorb water from the subsoil, while the plant does lose moisture due to evaporation. In addition, by digging a planting hole, the capillary action of the soil is broken, so that no upward water transport from the subsoil takes place. Of course, the losses after planting the young plants entail extra work, like removing dead plant material and placing new plants.

The invention contemplates obtaining a plant aid according to the opening paragraph whereby above-mentioned drawbacks are obviated while maintaining the advantages. In particular, the invention contemplates obtaining a plant aid whereby loss of the young plant due to lack of moisture is prevented. To this end, the plant aid further comprises a water collection sheet for collecting moisture present in the atmosphere, the water collection sheet being provided with a water collection surface comprising a receiving surface, which receiving surface operatively makes a first angle with respect to the orientation of gravity, and a collecting surface adjoining a lower edge of the receiving surface, which collecting surface operatively makes a second angle with respect to the orientation of gravity, the first angle being smaller than the second angle.

By use of the water collection sheet, moisture present in the atmosphere, such as rain, hail and/or snow, but also water vapor, can be collected relatively simply. The collected moisture can then be used to make up the moisture shortage of the plant.

Since the water collection sheet can extend further sidewards than the tube of the plant aid, the effective surface for receiving the moisture is increased. As a result, more water becomes available for the young plant than the inner space of the tube as it is could collect from precipitation.

The water collection sheet collects moisture present in the atmosphere in liquid form via the receiving surface and the collecting surface of the water collection surface. Under the influence of gravity, the moisture flows to lower parts of the water collection surface. Frozen moisture, such as hail and/or snow, also finds its way to the lower parts of the water collection surface in such a manner.

Further, the water collection sheet according to the invention is also arranged for collecting moisture present in the atmosphere in gaseous phase, i.e. water vapor. In suitable environmental conditions, such as a temperature of the water collection surface below the dew point and a sufficiently high humidity of the air, water vapor condenses on the receiving surface of the water collection surface. The water vapor precipitates on the receiving surface in the form of moisture drops. Under the influence of gravity, the moisture drops slide down along the receiving surface until they arrive at the lower edge of the receiving surface at the collecting surface. During the sliding down of the moisture drops, their size increases, since the condensed drops flow together due to cohesion. When they have arrived at the collecting surface, the larger drops slide to the lower part of the water collection surface. Since the first angle is smaller than the second angle, the component of gravity along the incline of the receiving surface is larger than the component of gravity along the incline of the collecting surface. As a result, gravity can relatively easily overcome the adhesion between the condensed drops and the receiving surface, so that the drops move downwards. Further, gravity can also relatively easily overcome the adhesion between the relatively large drops and the collecting surface in spite of the smaller incline, because the ratio of the magnitude of the adhesive force with respect to gravity decreases due to the larger volume of the drops. Due to the structure of the water collection sheet according to the invention, thus, small condensed drops can also gather at lower parts of the water collection sheet. Since, in this manner, relatively much moisture can be collected from the atmosphere, also, relatively much moisture can be supplied to the young plant to make up the shortage of moisture, so that loss of the young plant will decrease. In the collection of moisture present in the atmosphere, only passive structures are used which do not consume any external energy during use and do not comprise any moving parts.

In addition, by use of a receiving surface with a relatively small angle with respect to the orientation of gravity, further, the effective surface for condensation of moisture drops is relatively high, which is favorable to the amount of collected moisture.

The collection of water from the atmosphere by means of condensation also enables planting relatively dry and/or rocky areas. Soils containing salt or brackish water are also eligible for planting, since, due to the increased available moisture amount, segments in the subsoil can be formed with fresh water. In addition, plants and trees can be planted in an earlier stage, since the organism is better sheltered and taken care of by the plant aid according to the invention than in the case of the known plant aid. Of course, this has the advantage that fewer costs are involved for obtaining the younger plants. In addition, transport costs are lower. As a result of the constant water supply, the young plant can be planted on the soil instead of in a planting hole to be dug. Thus, the capillary of the soil is not disturbed and planting can also be done on rocky soils.

It is noted that a young plant is understood to mean a young plant in an early stage, such as a cultivated plant, young tree or shrub, but also just germinated plant material, a seed or a spore.

It is further noted that the tube surrounds the young plant at least partly sideways. Of course, it is also possible for the tube to be designed to be closed all round, so that the tube completely surrounds the plant. However, it is also possible to leave an opening or crack clear, for instance for providing germ material in the tube, after the plant aid has been positioned on the subsoil. Preferably, the young plant is provided such that the tube at least partly surrounds the root structure or root structure to be formed. The stalk, stem, branches and/or leaves are then substantially above the upper edge of the tube, so that sufficient air flowing along is available for the plant. Of course, it is also possible to position the young plant differently, for instance with the leaves at least partly below the upper edge of the tube, so that a better mechanical protection of the young plant is obtained.

In addition, it is noted that the number of receiving and/or collecting surfaces of the water collection surface can be chosen freely, but is not limited to one. Thus, the water collection surface may comprise, for instance, ten to twenty receiving and collecting surfaces. Of course, other numbers are also possible, for instance hundred. Further, one or a multiple number of water collection sheets can be used.

Thus, the plant aid according to the invention does not only act as protection from physical influences from outside, but also for supporting the plant and for stimulating growth of the young plant.

Preferably, the first angle, i.e. the angle which the receiving surface makes with respect to the orientation of gravity, is smaller than approximately 45°, more preferably smaller than approximately 30°, so that condensed drops relatively easily move downwards.

The second angle, i.e. the angle which the collecting surface makes with respect to the orientation of gravity, is preferably larger than approximately 45°, more preferably larger than approximately 60°, so that, with a constant width of the water collection sheet, still relatively much daylight and/or sunlight and/or ventilation remains available which can reach the young plant. Of course, the receiving and/or collecting surface may also be oriented differently with respect to gravity, for instance approximately 60° and 70°, respectively.

A receiving surface and/or collecting surface may have a substantially flat design. However, it is also possible for the receiving and/or collecting surface to have a curved design. Thus, the receiving surface and the collecting surface can merge into each other without a bend. In the framework of this application, 'the angle made by a surface' is understood to mean 'the angle made by a tangent of at least one segment of the surface'.

In an advantageous manner, the collecting surface comprises a channel section, so that moisture drops can specifically be guided to a lower part of the water collection sheet. Of course, other sections are also possible, such as a flat or slightly curved section. Preferably, the channel section has a base with a minimal width of approximately 5 mm in cross section, so that, during sliding downwards, water drops experience relatively few hindering adhesive forces from the side walls of the channel sections. The base has, for instance, a width in the range of approximately 5-15 mm, depending on the drop size to be expected. The drop size can be estimated on the basis of the distance maximally covered by the drop over a receiving and collecting surface. Of course, other dimensions of the base are also possible, for instance approximately 20 mm.

By designing the water collection surface to be substantially funnel-shaped, the collected moisture can easily be guided to the inside of the tube, so that the moisture benefits the plant. In addition, relatively much daylight and/or sunlight and/or ventilation is available to the young plant so that fungal growth is prevented and assimilation and/or ventilation processes are minimally influenced. However, the water collection surface may be designed differently, for instance as a cone frustum which has the largest diameter at the bottom side. The collected moisture can then be collected at the edges.

Preferably, the water collection surface comprises a projecting structure which is operatively oriented substantially upwards, while the surface of the projecting structure at least partly forms the receiving surface. Thus, it is possible to form relatively many receiving surfaces with respect to the sideward extension of the water collection sheet, so that the amount of collected moisture increases with constant transverse dimensions of the sheet. The projecting structure comprises, for instance, balls, pyramids, and/or rib sections.

Preferably, the plant aid further comprises a reservoir for storing collected moisture, so that the availability of the moisture can be regulated. Thus, the amount of moisture collected in a short time can be supplied to the plant over a longer period. All collected moisture can be guided into the reservoir. However, it is also possible to store only a part in the reservoir and to guide another part of the collected moisture directly to the plant.

By providing the reservoir substantially below the water collection sheet, the collected water can remain relatively cool, so that undesired evaporation is prevented. In addition, this yields a relatively stable construction which falls over less easily during the occurrence of, for instance, whirlwinds. The young plant is thus better protected against external influences.

By providing the reservoir with at least one irrigation point for supplying moisture present in the reservoir to a subsoil located therebelow, the moisture can be supplied from the reservoir in a dosed manner, so that the young plant is regularly provided with moisture.

Preferably, the top side of the water collection surface is further provided with an adhesion-reducing cover layer, for instance from PET and/or Teflon, so that a water-repellent effect is obtained. Thus, water drops can reach lower parts of the water collection surface more easily, so that the amount of collected moisture increases. Of course, other materials are also possible for forming a cover layer, such as a wax or silicone product.

By further providing the water collection sheet with thermal insulation material on the bottom side, heat exchange between the water collection sheet and the ambient air is limited. As a result, a temperature difference between the sheet and the ambient air can be maintained relatively long, for instance after a cool night. The water collection sheet maintains a relatively low temperature, also when the temperature of the ambient air increases, so that the condensation process, in which warm air flowing along cools down and condensation occurs, lasts relatively long, and consequently also the water collection process. Thus, the temperature of the sheet follows the variation in temperature of the ambient air in a delayed manner. Upon cooling down of the ambient air, for instance in the evening after a warm day, the dew occurring precipitates on the water collection sheet. In order to maintain temperature differences between the air and the sheet as along as possible, the water collection sheet may also be provided with material having a high specific heat.

The invention further relates a water collection sheet.

The invention further relates to a method for collecting moisture present in the atmosphere.

Further advantageous embodiments of the invention are described in the subclaims.

The invention will be explained in more detail with reference to exemplary embodiments shown in the drawing, in which.

Figure 11C:
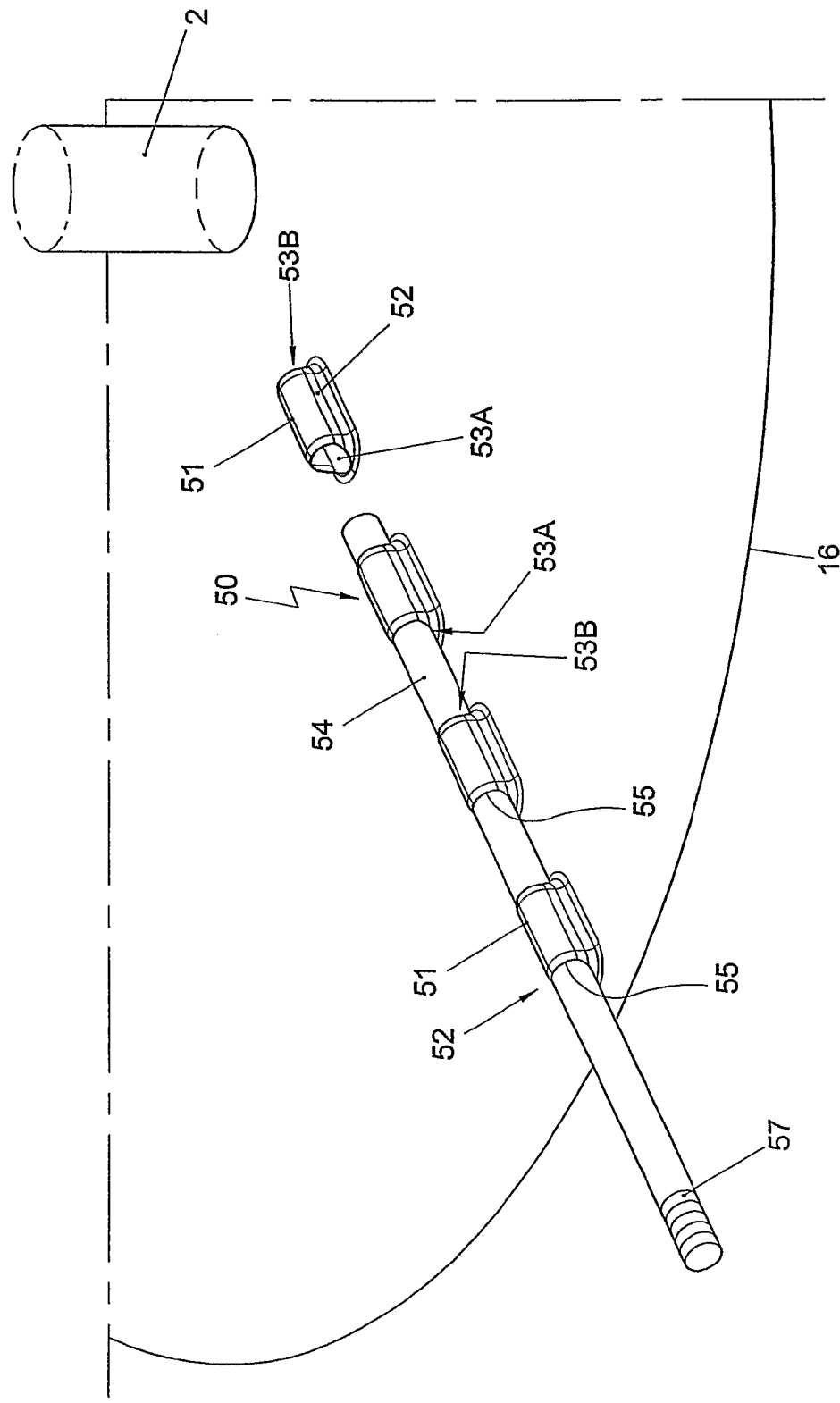
Figure 12:
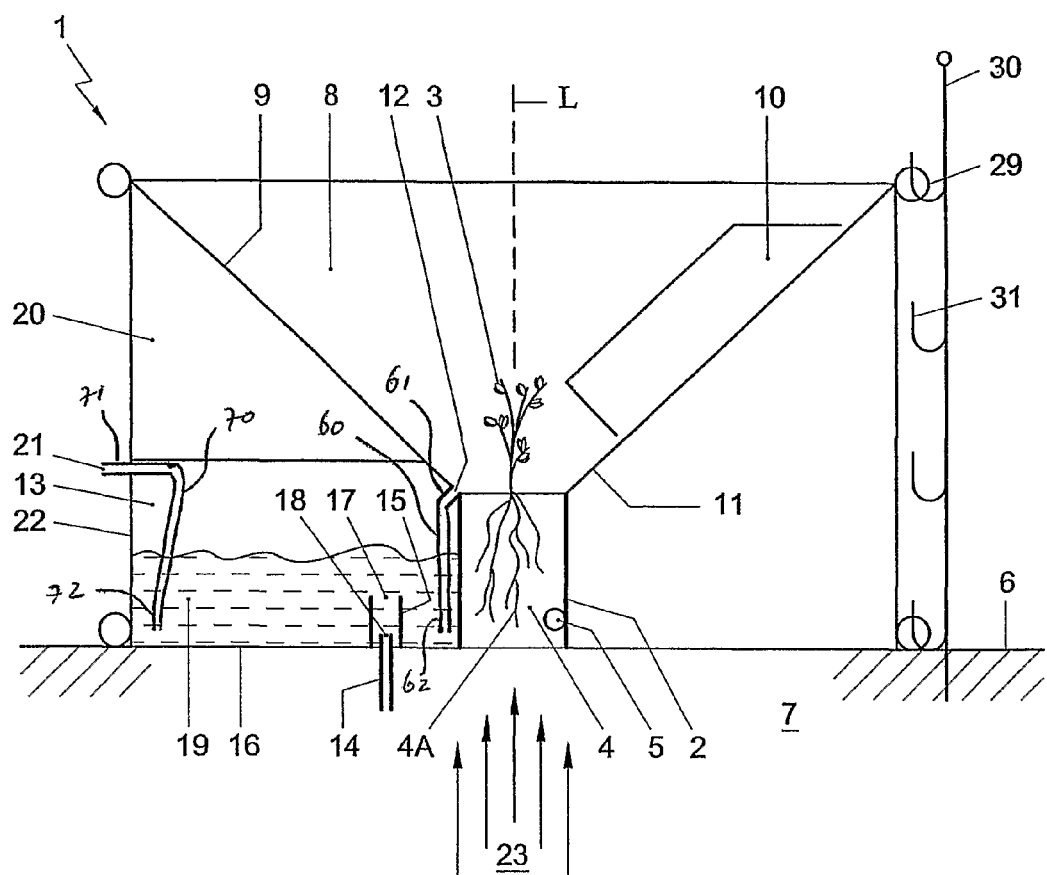

FIGS. 11A, 11B1, 11B2 and 11C show schematic perspective views of two alternative variant embodiments for a dosage system for supplying liquid from the reservoir; and FIG. 12 shows a schematic view of a cross section of a further embodiment of a plant aid according to the invention.

The Figures are only schematic representations of the invention and are exclusively given by way of non-limitative exemplary embodiments.

Figure 1:
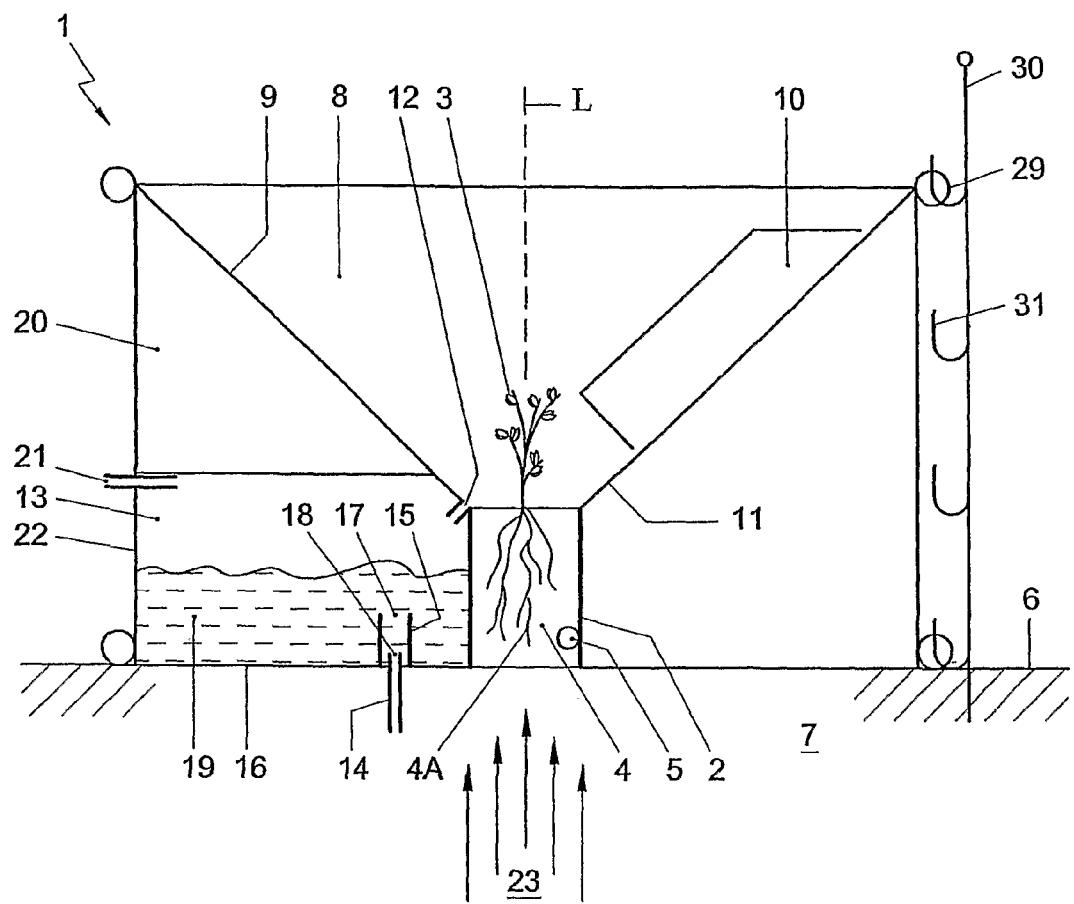
FIG. 1 shows a schematic view of a cross section of a first embodiment of a plant aid according to the invention.

FIG. 1 shows a schematic side elevational view of a first embodiment of a plant aid 1 according to the invention. The plant aid 1 comprises a tube 2 which sideways surrounds a young plant 3 such that the young plant 3 is completely enclosed sideways. The tube is open on the top side and bottom side, so that the plant can root downwards and can grow upwards. The young plant 3 is rooted in a soil block 4 which is positioned in the tube 2 such that the root structure 4a of the plant 3 is surrounded by the tube 2, while the lower side of the stalk is at the height of the lower edge of the water collection surface. Thus, the plant 3 is in the light and sufficient flowing air is available. The soil block 4 comprises a substance, for instance soil or substrate, and is provided in the opening of the tube wall 2 in clamped manner. The substance is optionally provided with symbiotic bacteria, eggs of animals, seeds, fungi, spores and/or organic and/or inorganic materials for nutrition of the plant 3, the so-called graft. If the plant aid is manufactured from degradable organic material, a graft may also be provided in this material. For an improved stability, the soil block 4 may optionally be placed further down the tube 2.

The plant aid 1 further comprises at least one graft shell 5 for supplying nutrients to the young plant 3. The graft shell 5 is preferably in the soil block 4 enclosed by the tube 2 and comprises at least one package which is degraded under the influence of erosion and/or bacterial action for a prolonged period, for instance months or years. In the package(s), material is present which stimulates the growth of the plant 3 and/or improves the condition of the plant 3, such as for instance nutrients and/or symbiotic bacteria. By using packages with different degradation periods, the substances present therein become available to the plant 3 in a dosed manner, so that, in the relatively long term, graft substances can autonomously be supplied to the plant 3. It will be clear to a skilled person that, instead of a graft shell 5, other means may also be used to nourish the plant, such as the above-described materials in the soil block 4.

The tube 2 is placed on the surface 6 of a subsoil 7. Preferably, the subsoil 7 has not been priorly treated or only slightly scraped, so that the capillary 23 of the subsoil 7 has not been broken. This prevents the occurrence unnecessary evaporation of moisture present in the subsoil 7. In addition, this stimulates that a constant supply of moisture continues to take place from the subsoil upwards by means of the non-broken capillary. Also, less erosion occurs. In addition, the above-described method saves labor-intensive treatments, such as for instance digging a hole in the subsoil. After the plant tube 1 has been placed, the young plant 3 roots in the subsoil 7 and directly comes into contact the capillary moisture 23, so that the plant is directly supplied with a daily constant amount of moisture both from the subsoil 7 and from the plant tube. Incidentally, it is possible to priorly treat the subsoil 7, so that the root structure of the plant can be provided into the subsoil 7. This can increase the chance of the plant 3 successfully striking root with sufficiently present moisture and a still lower loss can be expected.

The plant aid 1 further comprises a substantially funnel-shaped water collection sheet 8 with a water collection surface 9 comprising receiving and collecting surfaces 10, 11 which will be discussed in more detail with reference to FIGS. 2-5. The water collection surface 9 is provided with an adhesion-reducing cover layer or manufactured from water-repellent material or otherwise processed chemically and/or mechanically so that the surface is water-repellent to prevent adhesion of water drops to the surface 9 and to promote mutual cohesion between the water drops.

Collecting surfaces 11 all open only partly or not at all into the tube 2, so that collected moisture from the atmosphere, such as rainwater and condensation water can directly benefit the young plant 3, if desired. Further, in the water collection surface 9, openings 12 are provided which serve as inlet points for letting moisture on the water collection surface 9 through to a reservoir 13 located below the water collection sheet, so that the collected moisture can be stored. The reservoir 13 rests on the surface 6 of the subsoil 7, so that a stable position of the plant aid 1 is obtained. Further, due to the covering of the environment of the young plant by the plant aid, the growth of plant material in the immediate proximity of the young plant 3 is prevented, so that as much light as possible and as many available nutrients in the subsoil 7 as possible benefit the young plant 3. The presence of the reservoir 13 also limits evaporation of moisture from the subsoil around the plant 3. In the reservoir 13 shown, an amount of moisture 19 is already present. The reservoir is provided with one or a multiple number of irrigation points for supplying moisture present in the reservoir 13 to the subsoil 7 located therebelow.

The irrigation point shown is designed as a hollow needle 14 which serves as a dripper. With the aid of the hollow needle 14, the moisture present in the reservoir can be introduced into the subsoil 7 in a dosed manner, so that durable fresh water supply is realized. The reservoir 11 with the irrigation point also allows relatively large amounts of rainwater collected in a relatively short period to still be supplied to the subsoil 7 for a relatively long time. The hollow needle 14 also serves as an anchoring for further increasing the stability of the plant aid 1. Of course, it is possible to implement the irrigation point differently, for instance as an opening in the bottom 16 of the reservoir 13, or as a capillary string. The dosage of the flow of moisture to be supplied to the subsoil 7 is optionally settable with the aid of extra regulating means. The regulating means comprise, for instance, a permeable film or a membrane provided in the passage of the hollow needle 14.

The reservoir 13 comprises an outflow channel 15, also called overflow pipe, of which a first end 17 is operatively located above the bottom of the reservoir 13 and of which a second end 18 connects to the irrigation point, in the embodiment shown the hollow needle 14. By use of the overflow pipe 15, it is achieved that solid particles in the stored moisture 19, such as dirt and/or dust, which are on the bottom 16 of the reservoir 13 up to the level of the first end 17 of the overflow pipe 15 do not reach the subsoil 7 via the irrigation points. This prevents blockage of the irrigation points. The overflow pipe 15 thus acts as a simply provided filter for settled solid particles in the stored moisture 19.

Figure 7:
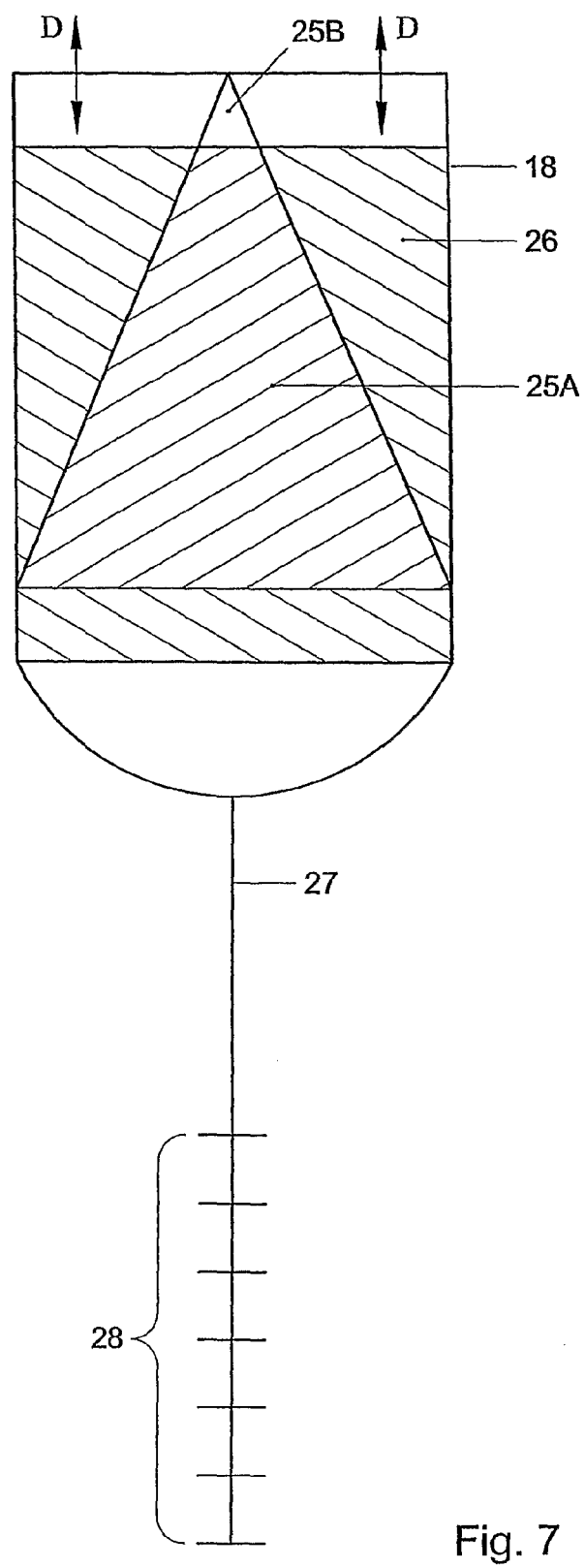
FIG. 7 shows a schematic view of a cross section of regulating means according to the invention.

The dosage of the flow of moisture to be supplied to the subsoil is also optionally settable with the aid of extra regulating means. The opening of an irrigation point, for instance the hollow needle 14 or an opening in the bottom of the reservoir, is closed by a slidable plate 26 which can be slid into a sliding direction D by means of a drive element designed as pin 27, as shown in FIG. 7. A first part 25A of the irrigation opening cleared by the plate 26, and a second part 25B of the opening is closed by the plate. By sliding, the irrigation point becomes larger or smaller so that the dose becomes larger or smaller. By providing a calibration 28 on the pin 27, the supply can be regulated, optionally depending on the amount of moisture collected by the plant tube. In addition, due to the sliding plate 26, any blockage of the irrigation point can be removed. Due to the substantially triangular shape of the opening 25A, 25B and the substantially rectangular shape of the sliding plate 26, the sliding plate 26 acts as a razor so that blockages can be removed more easily. Of course, the geometry of the plate 26 and the opening 25A, 25B can also be chosen differently, for instance as a triangle and a rectangle, respectively.

An alternative solution for supplying the moisture 19 to the subsoil in a dosed manner is shown in FIG. 11*a*. This Figure shows that the bottom 16 of the reservoir is provided with a push element 50 reaching inwards. The push element comprises an elevated bottom part 51 of which one or more side walls 52 define an exit opening in the bottom 16.

In the embodiment shown, a strip-shaped push element 50 is provided which has a tunnel-shaped design and which is provided with two exit openings 53A, 53B. It will be clear that it is also possible to use more or fewer push elements 50, and to provide, for instance, one exit opening 53, or more exit openings 53 per push element 50.

If desired, the exit openings 53 can be closed in an elegant manner with a slide 54 which reaches, near the exit openings 53, through a recess 55 in the side wall 52 of the push element 50.

With the aid of the slide 54, the surface of the exit opening 53 can be set, so that the flow of moisture 19 exiting from the reservoir can be set.

In an elegant manner, the exit openings 53 of multiple push elements 50 can be operated simultaneously, for instance with the aid of a forked slide 54. Optionally, the slide may be provided with a calibration 57.

Figure 2:
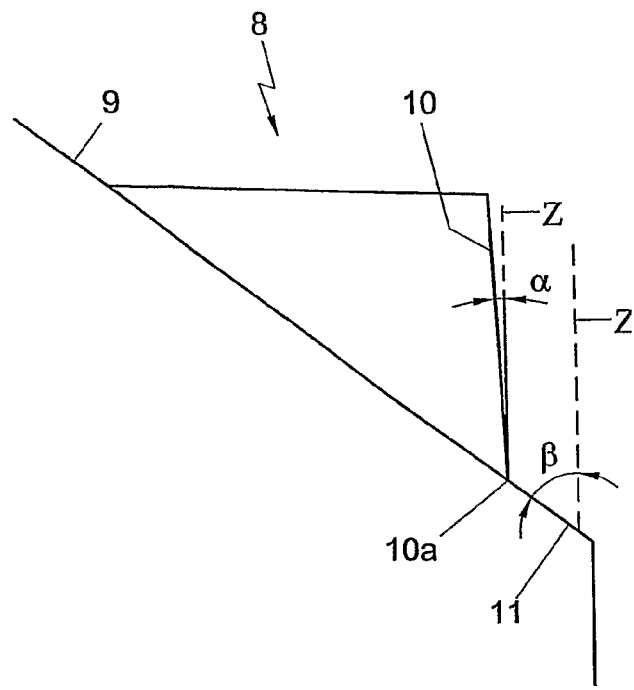
FIG. 2 shows a schematic view of a cross section of a first embodiment of a water collection sheet of the plant aid of FIG. 1.

In an alternative embodiment, as shown in FIG. 11B, the slides 54 can extend through the openings 53A, 53B of the tunnel-shaped push elements 50. In such a variant, widenings are provided in the slide 54 which can close and clear the openings as shown in FIGS. 11B1 and 11B2, respectively.

FIG. 11C shows a further embodiment, in which the push elements 50 are aligned. The push elements are, just like with the variant of FIG. 11C, each provided with openings 53A, 53B. In this embodiment, the slide 54 reaches through the aligned openings 53A, 53B, such that the slide 54 closes the openings 53A, 53B in the push elements 50. By adjustment of the slide 54, more or fewer push elements can be released for discharging moisture via their openings 53A, 53B. In this variant, the push elements 50 may, for instance, also have a hemispherical or disc-shaped design, and holes 55 may be provided in the wall 52 of the push elements 50.

The supply systems shown in FIGS. 11A, 11B1, 11B2 and 11C are particularly advantageous, because they can be realized with a minimal number of additional parts. In particular, the push elements can easily be provided during the manufacture of the reservoir, and the operating slide can simply be introduced later.

The regulating means may, for instance, also comprise a permeable film, a capillary string or a membrane provided in the passage of the hollow needle 14. By use of the slidable plate 26, it is advantageously possible to adjust the supply rate in the course of time.

In addition, the reservoir 13 is provided with an overflow opening 21 in the tube 22 of the reservoir 13, so that excess moisture can flow away easily. The overflow opening 21 is positioned just above the level of the opening 12.

On the bottom side, the water collection sheet 8 is provided with thermal insulation material 20, so that a temperature difference between the water collection surface 9 and the surrounding atmosphere is maintained as long as possible to promote the dew and condensation process. The bottom side of the insulation material may have either a horizontal or a concave or convex design, the concave shape preventing the evaporation of the moisture stored in the reservoir 13.

Figure 8:
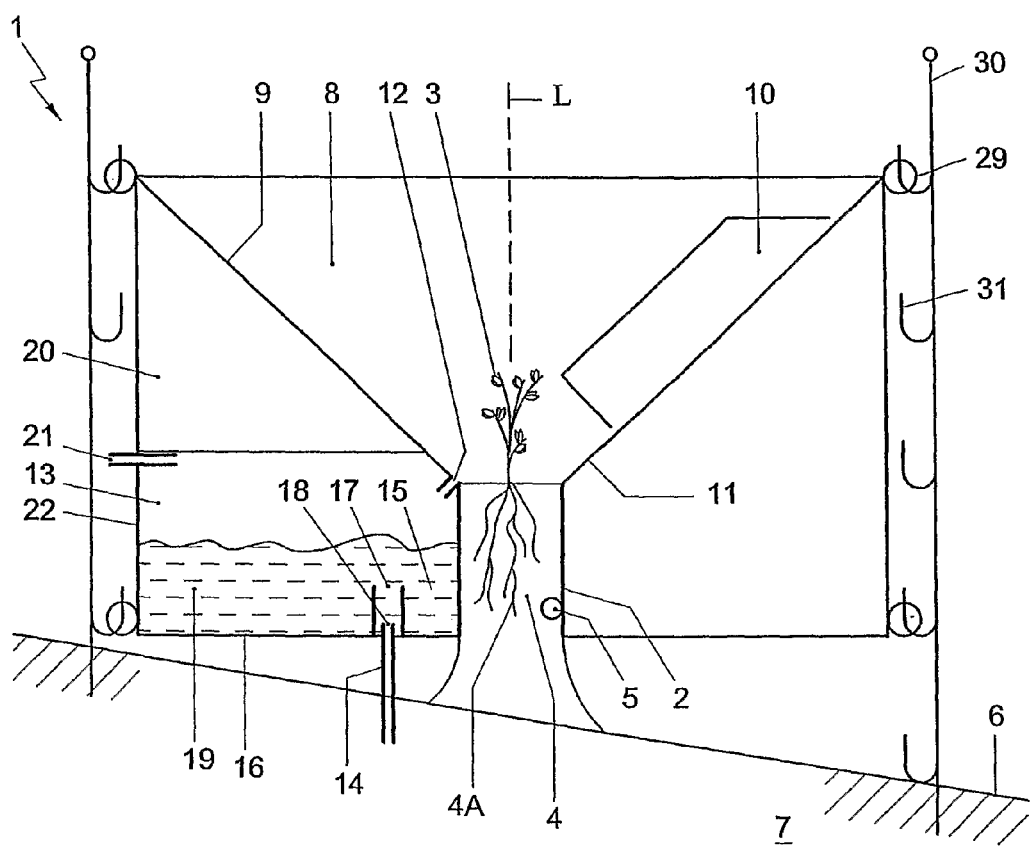
FIG. 8 shows a schematic view of a cross section of the plant aid of FIG. 1 on an inclined slope.

Further, on the outside, the plant aid is provided with eyes 29. Through the eyes 29, an anchoring pin 30 may be provided for anchoring the plant aid to the subsoil 7. Optionally, on the pin, at different distances, a hook 31 is provided which can engage an eye of the plant aid. Thus, a pin can carry the plant aid at a desired height. Also, the orientation of the plant aid can be set, so that the plant aid can be positioned substantially horizontally on an inclined, sloping subsoil, as shown in FIG. 8. Preferably, the eyes are evenly distributed over the perimeter of the plant aid, for instance at every 90°. The pin is further optionally provided with arms extending substantially sideways, so that the pin can be stabilized sideways against the surface 6 of the subsoil 7.

Figure 3:
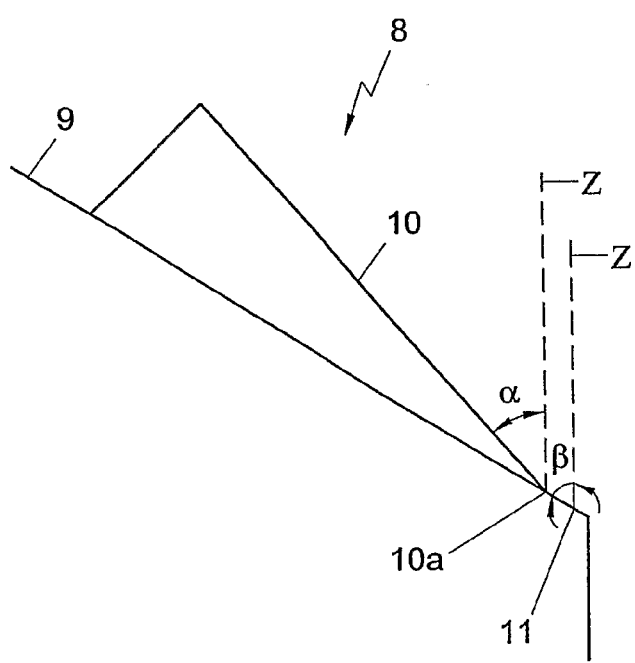
FIG. 3 shows a schematic view of a cross section of a second embodiment of a water collection sheet of the plant aid of FIG. 1.

FIGS. 2 and 3 show a schematic side elevational view of a first and a second embodiment, respectively, of a water collection sheet 8 of the plant aid 1. The water collection sheet 8 has a water collection surface 9 which is oriented substantially upwards for collecting moisture present in the atmosphere. Due to a specific structure, the water collection surface 9 comprises at least one receiving surface 10 and at least one collecting surface 11 for obtaining and collecting the moisture, respectively. The receiving surface 10 makes a first angle $\alpha$ with respect to the orientation of gravity Z. The collecting surface 11 makes a second angle $\beta$ with respect to the orientation of gravity Z. The first angle $\alpha$ is smaller than the second angle $\beta$, so that, in principle, drops on the receiving surface 10 slide down faster than drops on the collecting surface 11. Since the collecting surface 11 adjoins a lower edge 10*a*, relatively many drops will gather near the collecting surface 11 and form larger drops due to cohesive forces. Larger drops experience relatively fewer adhesive forces from the water collection surface 9, so that a second angle $\beta$ which is larger than the first angle $\alpha$ is sufficiently steep to make the drops slide down along the collecting surface 11 into the tube 2 or into an opening 12 to the reservoir 13.

Water drops on the receiving surface 10 are obtained by receiving precipitation, dew and/or condensation, with the receiving surface 10 acting as a condensing surface. Solid precipitation is received and collected in the same manner as wet precipitation.

In the first embodiment of the water collection sheet 8, as shown in FIG. 2, the first angle $\alpha$ is very small, for instance a few degrees; the second angle $\beta$ is approximately 45°. In the second embodiment of the water collection sheet 8, as shown in FIG. 3, the first angle $\alpha$ is larger, for instance 30°.

Figure 4:
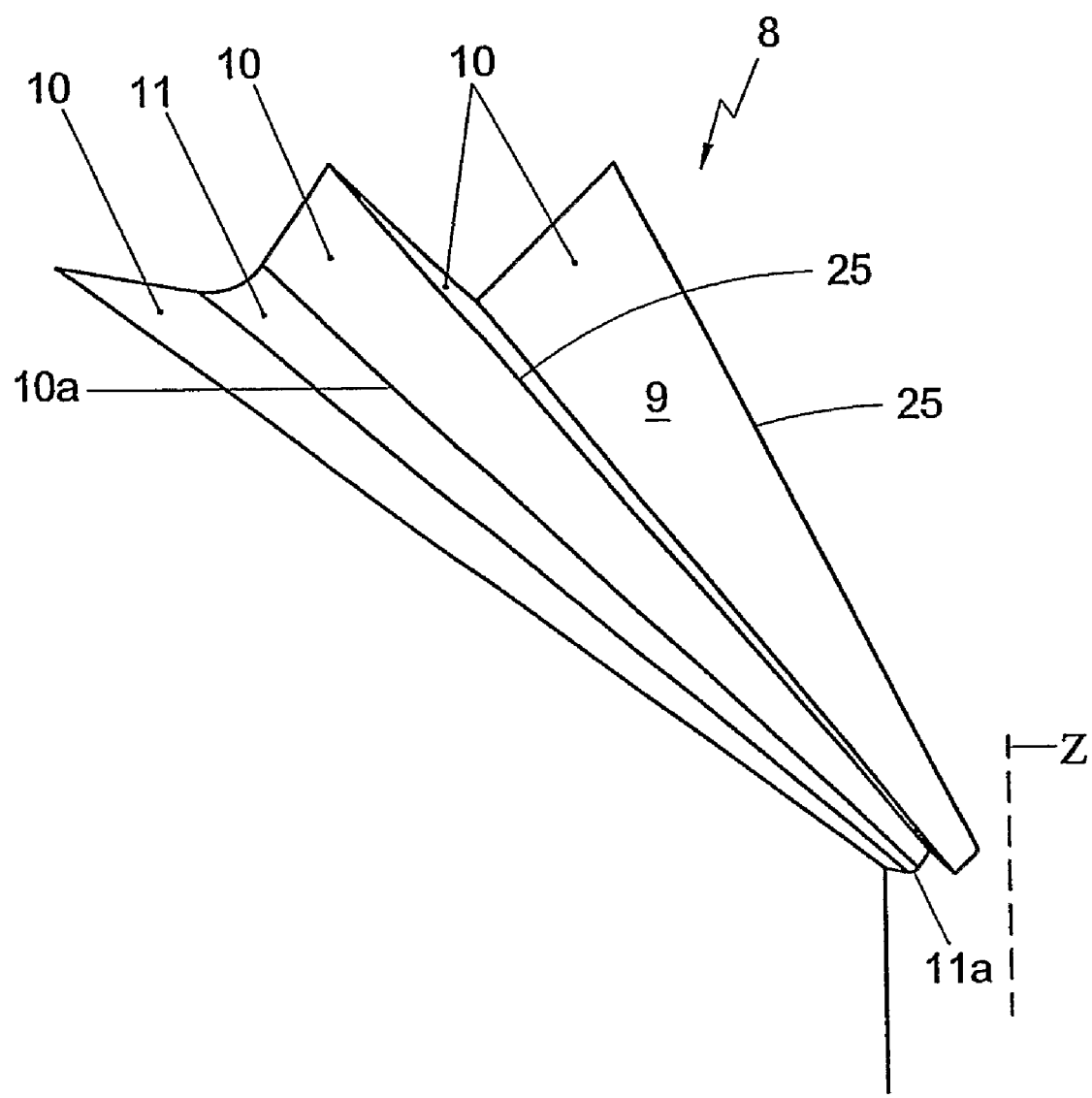
FIG. 4 shows a schematic perspective view of a third embodiment of a water collection sheet of the plant aid of FIG. 1.

FIG. 4 shows a schematic perspective view of a third embodiment of a water collection sheet 8 of the plant aid 1.

Due to the formation of ribs 25 on the water collection sheet 8, relatively steep receiving surfaces 10 and relatively less steep collecting surfaces 11 are formed with angles with respect to the orientation of gravity Z, as described hereinabove. The collecting surface 11 comprises a channel section 11a for guiding the water drops, via a channel to an opening 12 in the water collection surface 9 or to the tube 2. The channel section 11a has a base which is minimally 2 mm wider than the diameter of the water drops, for instance in the range of approximately 5 to approximately 15 mm, such as for instance 10 mm.

Figure 5:
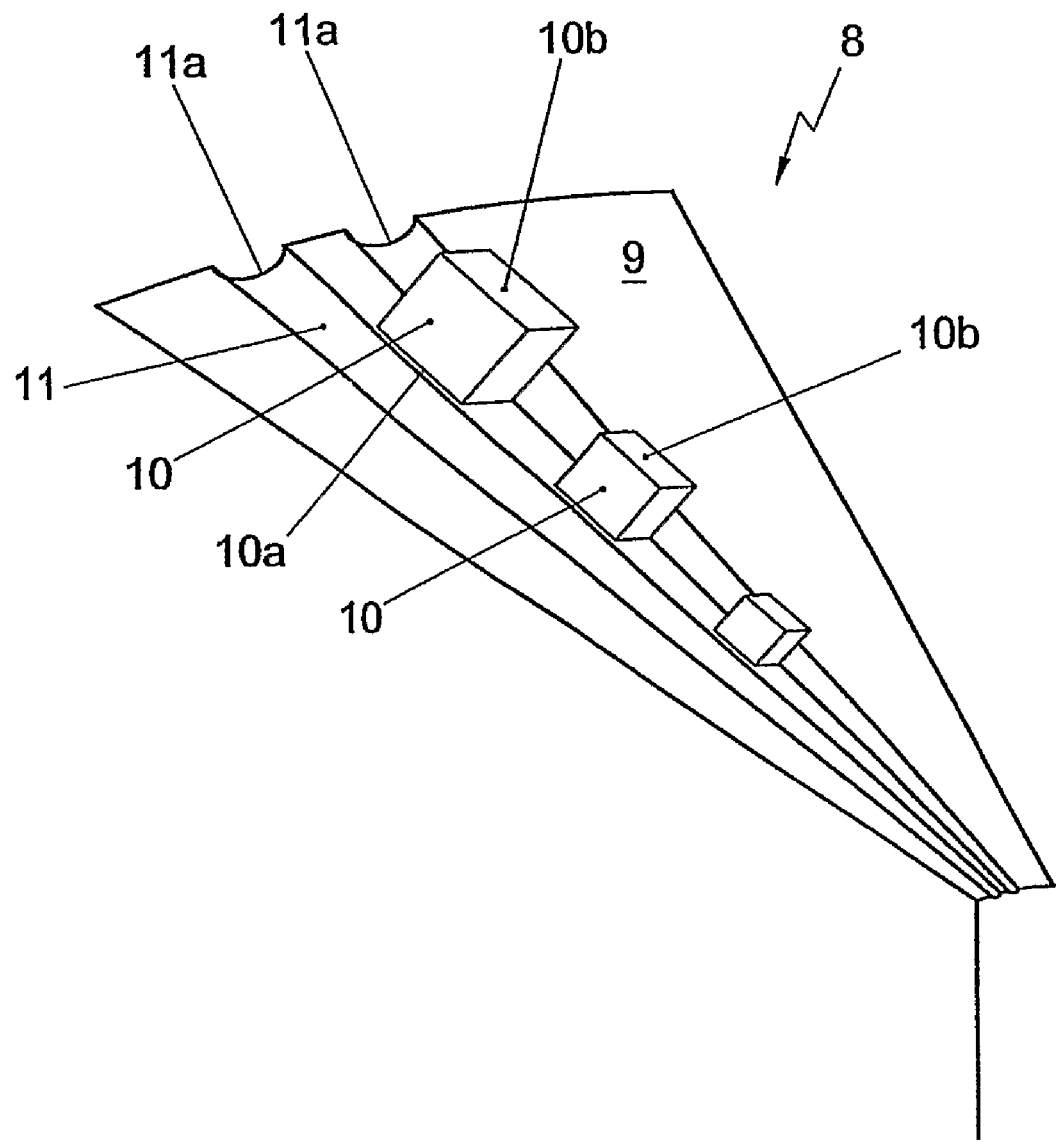
FIG. 5 shows a schematic perspective view of a fourth embodiment of a water collection sheet of the plant aid of FIG. 1.
Figure 6:
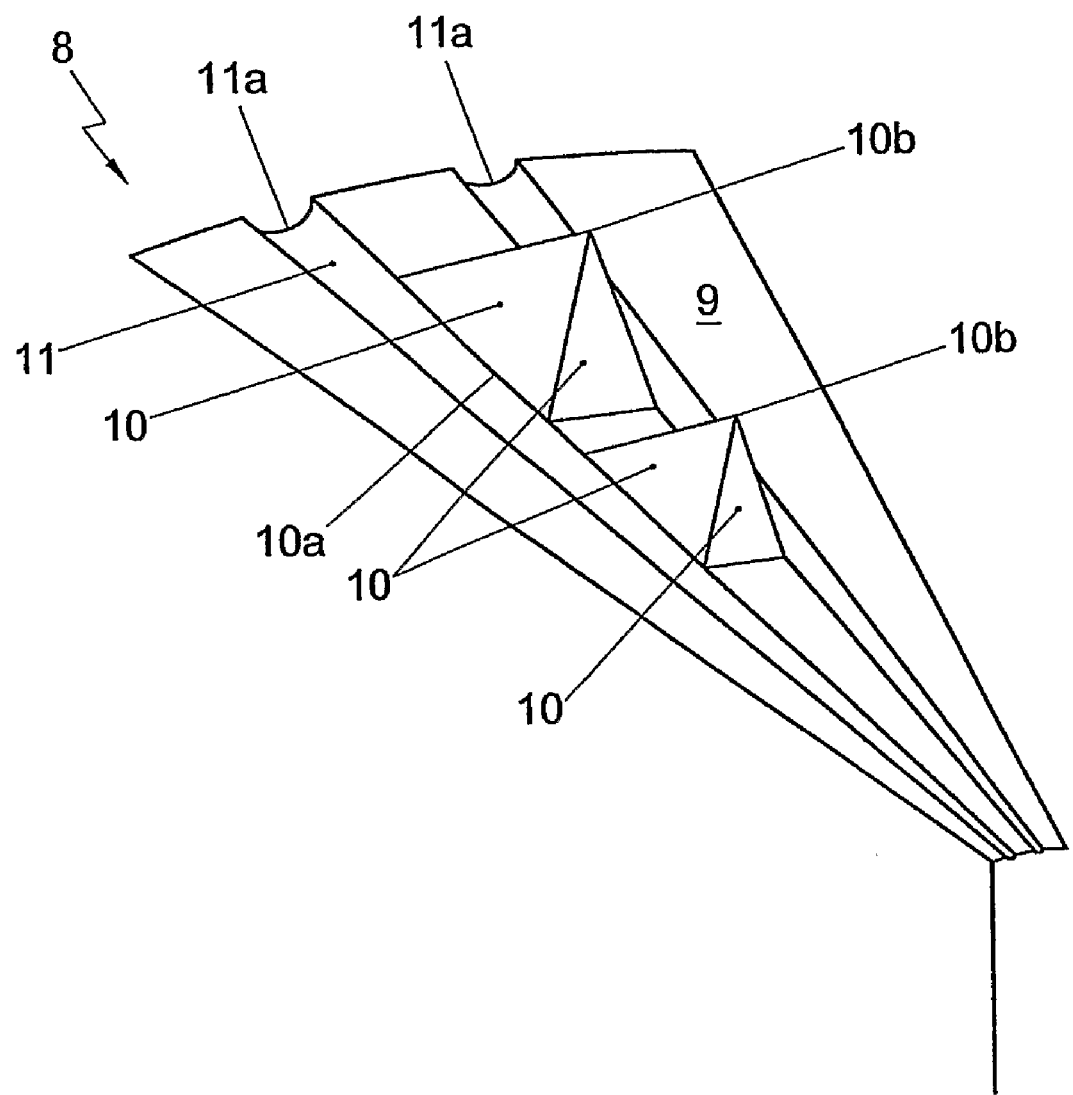
FIG. 6 shows a schematic perspective view of a fifth embodiment of a water collection sheet of the plant aid 6f FIG. 1.

FIG. 5 shows a schematic perspective view of a fourth embodiment of a water collection sheet 8 of the plant aid 1. The water collection sheet 8 comprises structures 10b projecting from the sheet 8, in the shape of blocks, so that receiving surfaces 10 are formed. Due to the projecting structures, in addition, the effective surface of the water collection sheet 8 is increased, so that extra moisture can be collected from the atmosphere. Of course, the projecting structures may also be shaped differently, for instance as pyramids as shown in FIG. 6.

Preferably, the tube 2 comprises two detachable wall parts, for instance wall parts which are arranged pivotally with respect to a pivot which is oriented substantially parallel to the longitudinal axis L of the tube 2. Thus, the plant aid can easily be built up around a young plant 3. Other parts of the plant aid 1 may also be built up separately or integrally as desired in order to carry out the construction of the plant aid 1 simply and quickly. The plant aid 1 can also be dismantled relatively simply. Thus, the two wall parts can pivot outwards without causing any appreciable damage to the plant, for instance when the plant 3 has grown sufficiently. Optionally, the plant aid 1 can be reused. However, it is also possible to manufacture the plant aid 1 from (biologically) degradable materials, so that dismantling work is limited or is completely unnecessary. In the latter situation, the plant aid 1 can advantageously be provided with at least one graft shell 5.

The tube 2 is, for instance, circular with a constant cross section. However, it is also possible to shape the tube 2 differently, for instance elliptical or rectangular. In addition, the dimensions in cross section may vary, for instance conical for optimizing captured daylight and/or sunlight.

In a preferred embodiment according to the invention, in top plan view, the tube 2 encloses a surface of approximately 1 dm². In top plan view, the water collection sheet 8 has a larger surface, for instance 1 m², so that relatively much moisture can be collected. Due to the proportion of these surfaces, the apparent precipitation amount increases, so that, by efficient use of rainwater, successful planting is also possible in relatively dry areas.

Figure 9:
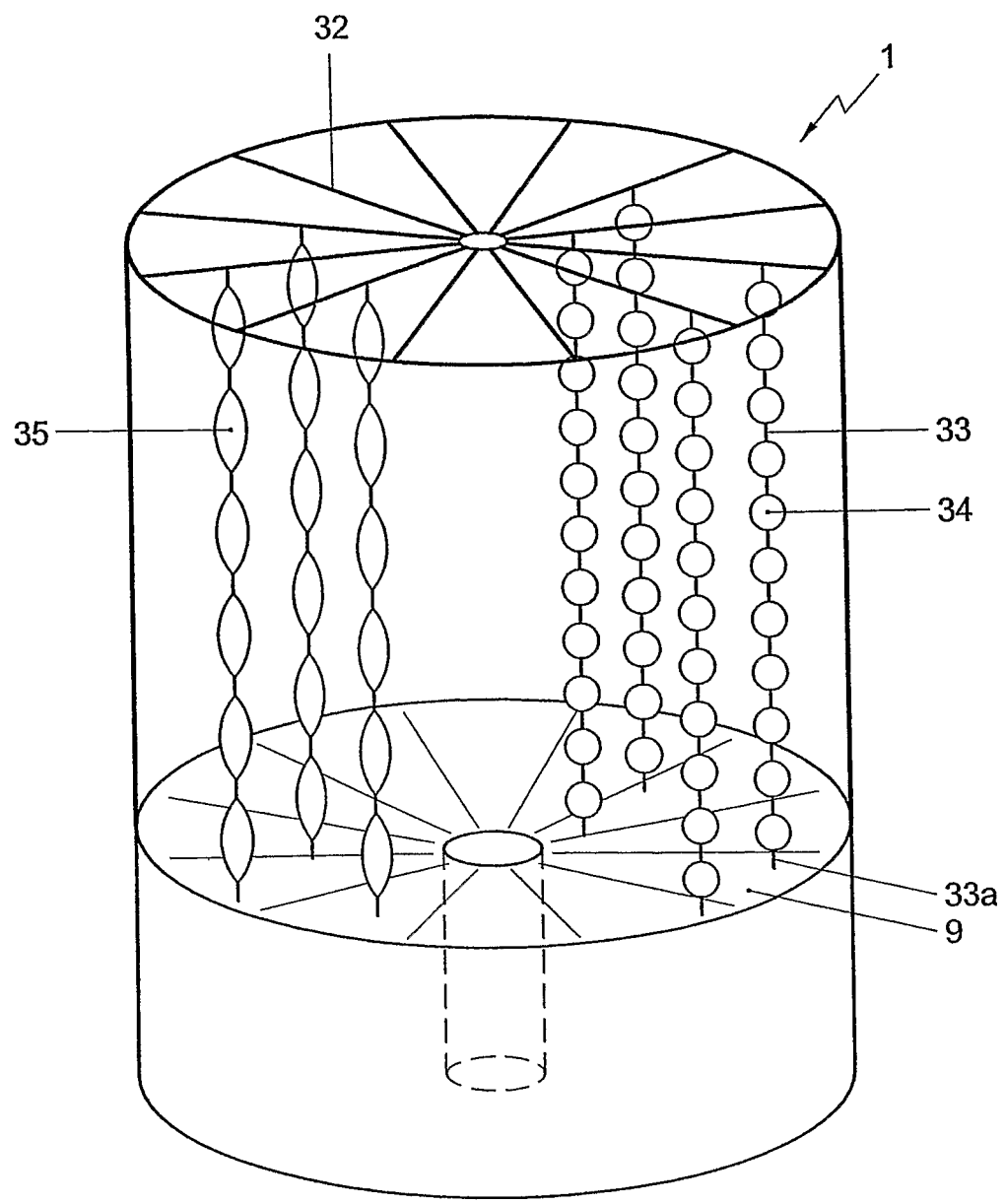
FIG. 9 shows a schematic perspective view of a second embodiment of a plant aid according to the invention.

FIG. 9 shows a schematic perspective view of a second embodiment of a plant aid 1 according to the invention. For collecting moisture present in the atmosphere, the plant aid comprises not only the water collection sheet 9 as discussed on the basis of the first embodiment of the plant aid 1, but also a threadlike structure with local thickenings which are located substantially above the water collection surface. A frame 32 extends upwards and supports the threadlike structure 33 of which an end 33a is located near the water collection surface 9. The threadlike structure is provided with local thickenings, which preferably have rounded shapes, such as thickenings with substantially a spherical or ellipsoid shape. With the aid of the threadlike structure with local thickenings, the surface on which condensation and/or reception of dew drops takes place is increased. Under the influence of gravity, the drops slide to the end 33a of the threadlike structure and fall on the water collection surface 9 where collection as described hereinabove takes place. Thus, relatively much moisture can be abstracted from the atmosphere, which is favorable in areas where little or no precipitation and/or condensation occurs, and where a young plant loses relatively much moisture due to evaporation. Due to the threadlike structure used, the light yield and/or ventilation for the young plant remains practically equal in an advantageous manner. By varying the number of threads, the amount of moisture abstracted from the atmosphere, and consequently the moisture flow benefiting the plant can be decreased or increased. The threadlike structure may have a relatively thin and/or flexible design. However, it is also possible for the threadlike structure to have a relatively stiff design, so that the threadlike structure comprises pin-shaped segments. Further, it is possible for the threadlike structure to be supported by the collection sheet 9 or a supporting structure located below the collection sheet 9. It is noted that, instead of thickening of the threadlike structure, other modules may also be used, for instance plates fixed to the threadlike structure.

Preferably, the plant aid has a nontransparent design, so that formation of weeds inside the plant aid is prevented.

Figure 10:
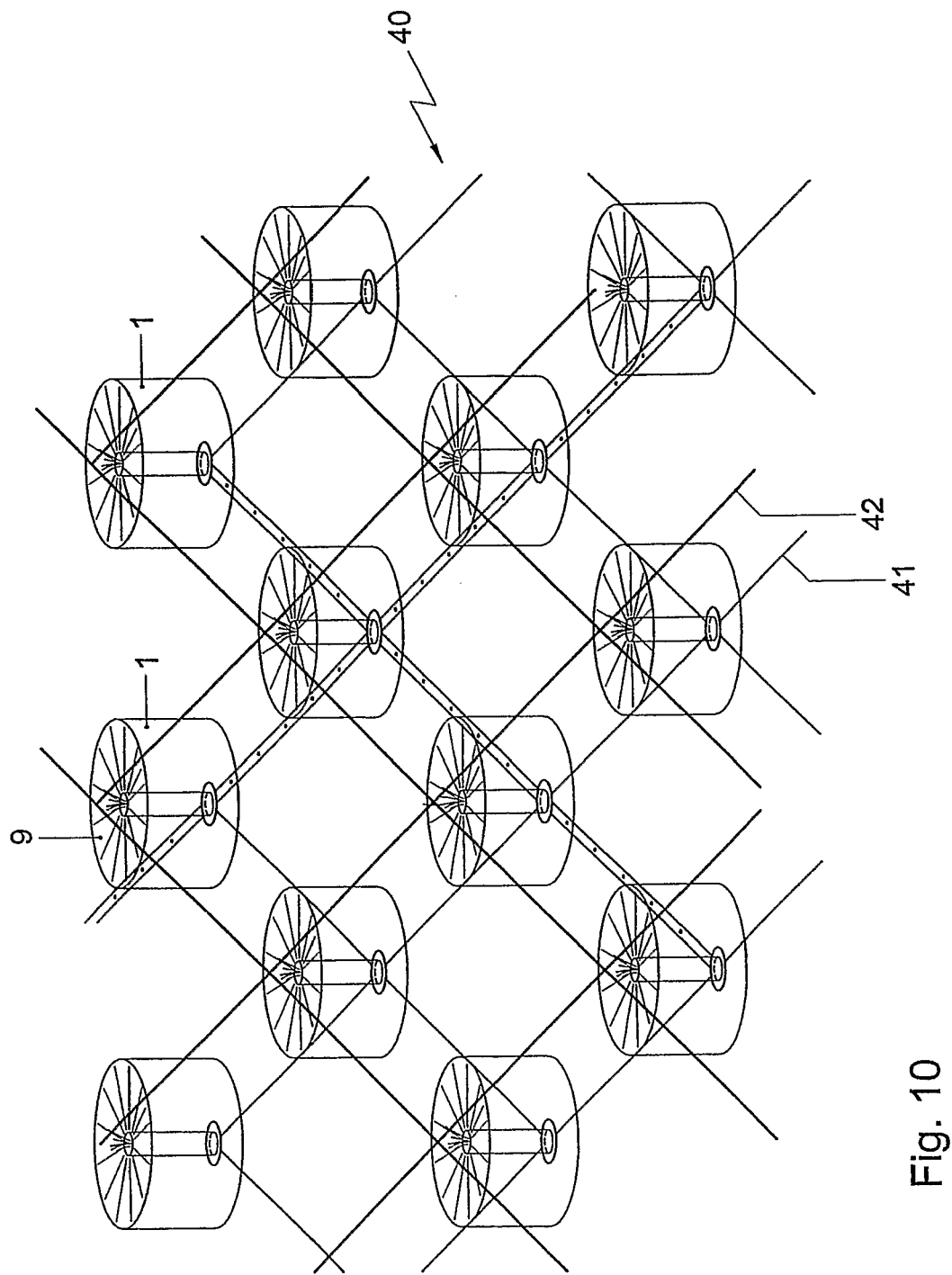
FIG. 10 shows a schematic perspective view of a flat supporting structure according to the invention.

In a further advantageous embodiment according to the invention, the plant aid 1 further comprises a substantially flat supporting structure 40 for supporting the tube 2, as shown in FIG. 10. The substantially flat supporting structure 40 is, for instance, designed as a stiff interweaving or as a flexible net. Optionally, the substantially flat supporting structure may support a multiple number of plant aids, for instance for manually and/or mechanically transporting the plant aids to a planting location. In addition, thus, the plant aids can relatively easily be brought to areas which are relatively difficult to access, for instance on steep slopes.

The flexible net, also called planting net, can comprise one or a multiple number of layers which are preferably manufactured from organic and/or from inorganic materials. The planting net preferably comprises a soil net 41 and a top net 42.

The soil net 41 serves to support a multiple number of plant aids, including the young plants. The graft may be provided in the soil net. The young plants may be fixed to the soil net. After impregnation, the ground net 41 is also suitable as a growth soil and carrier of the graft. With use with a graft, the net may, optionally industrially, be rolled up and may, optionally automatically, be unrolled during planting. If the soil net is to support already germinated plants or larger plants, the net can be unrolled in advance after which the plants are fixed to the net, for instance with the aid of a click system. Then, the net can be supported with manpower or in a mechanical manner to the location where the plants are to be planted.

The soil net 41 is dimensioned such that it is, depending on size and/or weight of the soil block and/or plant weight and/or tube weight, sufficiently strong to serve as a transport movable by a few persons if the total weight is relatively small. With a relatively large total weight, optionally, machines may be deployed. By use of the planting net, the planting rate is increased and areas which are difficult to access, such as mountain slopes, swamps and the like become accessible for planting.

With use of automatic planting net laying devices and/or helicopters, the planting rate can be increased, in particular in areas which are difficult to access.

The planting net including graft and/or young plants may also be deployed in fighting erosion. Due to the high planting rate, large areas can be planted in a short time, so that plants can be sown and planted at the right time. Also, with the aid of the plant aid, plants may optionally be planted outside conventional planting periods.

The planting net also has the advantage that it can be adjusted to the circumstances and the shape and the condition of the plant environment. Optionally, with digital photography together with GPS, the land to be planted may be mapped.

Then, for instance, locations with only water, tors, freestanding single trees and the like can be provided as recesses in the planting net. Also, the net can be designed such that the conical shape of a mountaintop or hilltop is taken into account. In addition to the adjustment to the shape and to the condition of the environment, due to a special design of the nets, plants can also be provided in a shape and/or assortment desired by the planter. Here, possibilities are, for instance, windbreaks, optionally fast-growing plants or trees to protect other crops to be planted.

The top net 42 serves to guide and support the developing plant. This prevents stalks of young plants from falling down or snapping down, for instance as a results of winds with high speeds which can particularly occur at a relatively great height. The top net 42 may optionally be designed such that it grows along upwards. Thus, the top net 42 can be provided on top of the tops of the plant or halfway up the stalk.

In an advantageous manner, according to the invention, the use of expensive and complex machines is not required for planting, as it is indeed the case with use of sugar beet strip, where seeds are planted so at to be surrounded by strip, or a mulch pump where a layer consisting of binding agent, seeds, artificial fertilizers and the like is sprayed on by means of a high-pressure pump to obtain a growth layer for a lawn. In addition, areas which are difficult to access, such as for instance mountain slopes or swamps, which are not or hardly accessible to traditional machines, can be planted. In addition, the planting net has still more advantages over the sugar beet strip, viz. a better protection with high wind speeds, positioning of the plant aid and settable thickness of the net for the purpose of grafting.

It is noted that the substantially flat supporting structure is not only suitable for supporting one or more plant aids according to claim 1, but that the substantially flat supporting structure can also be used for supporting at least one plant aid 1 comprising a protecting structure for protecting a young plant.

FIG. 12 shows a schematic view of a cross section of a further embodiment of a plant aid 1 according to the invention.

The reservoir 13 comprises an inlet pipe 60 which, by a first end 61, inwardly connects to the edge of the opening 12 in the water collection surface 9. By use of such an inlet pipe 60, loss of moisture present in the reservoir 13 due to evaporation is reduced considerably. This is because the amount of moisture which can evaporate increases when the size of the liquid surface which is in gas connection with the opening 12 increases. Conversely, the amount of liquid lost by evaporation decreases as the size of the liquid surface which is in gas connection with the opening 12 decreases. Since the liquid surface in the inlet pipe 60 is much smaller than the rest of the liquid surface in the reservoir 13, the evaporation through the opening 12 is proportionally smaller, and accordingly also the loss of moisture by means of evaporation from the reservoir 13. Thus, the liquid in the inlet pipe 60 forms a barrier for moisture evaporating from the rest of the liquid surface in the reservoir 13.

Due to the inlet pipe 60 reaching, by a second end 62, to just above the bottom 16 of the reservoir 13, the inlet pipe 60 also functions if only a small amount of moisture is present in the reservoir, because the second end 62 of the pipe 60 is still below the liquid surface then.

Preferably, the inlet pipe 60 tapers in the direction of the first end 61, so that obstructions at the bottom of the inlet pipe are prevented in an advantageous manner.

Further, the reservoir 13 comprises an overflow pipe 70 which, in a similar manner, connects to the edge of the outflow opening 21 by a first end 71 and reaches to just above the bottom 16 of the reservoir 13 by a second end 72, so that evaporation of moisture through the outflow opening 21 is prevented. In order to prevent obstructions in the overflow pipe 70, the pipe can be constructed such that the pipe tapers in the direction of the first end 61, as is the case with the inlet pipe 60.

The invention is not limited to the exemplary embodiment described herein. Many variants are possible.

Thus, the water collection surface may be designed in different colors. By providing the surface with a light color, the heat absorption by means of sunlight is relatively small, so that a condensation process for collecting water remains effective for a long time.

Further, the water collection sheet cannot only be used in combination with a plant aid, but also independently for collecting moisture present in the atmosphere, for instance with the aid of fixing means for fixation on buildings, craft, such as sailing ships, or on other floating constructions offshore. The collected moisture may be processed for obtaining drinking water or otherwise, for instance for chemical processes and/or irrigation purposes.

Use of a plant aid according to the invention is further possible by positioning it above salt or brackish water, since condensation of evaporated salt or brackish water results in fresh water production.

Such variants will be clear to a skilled person and are understood to be within the scope of the invention as set forth in the following claims.

The invention claimed is:

1. A plant aid for protecting a young plant, comprising a tube at least partly sideways surrounding a young plant placeable in the plant aid, further comprising a water collection sheet for collecting moisture present in the atmosphere, wherein the water collection sheet is provided with a water collection surface comprising a receiving surface, which receiving surface operatively makes a first angle with respect to the orientation of gravity, and a collecting surface adjoining a lower edge of the receiving surface, which collecting surface operatively makes a second angle with respect to the orientation of gravity, wherein the first angle is smaller than the second angle, wherein the collecting surface has an inclination and comprises a radial extending channel section for guiding moisture drops to a lower part of the water collection sheet.

2. The plant aid according to claim 1, wherein the first angle is smaller than approximately 45°.

3. The plant aid according to claim 1, wherein the second angle is larger than approximately 45°.

4. The plant aid according to claim 1, wherein the collecting surface comprises a channel section.

5. The plant aid according to claim 4, wherein, in cross section, the channel section has a base with a width in the range from approximately 5 to approximately 15 mm.

6. The plant aid according to claim 1, wherein the water collection surface is substantially funnel-shaped.

7. The plant aid according to claim 1, wherein the water collection surface comprises a projecting structure which is operatively oriented substantially upwards and wherein the surface of the projecting structure at least partly forms the receiving surface.

8. The plant aid according to claim 1, further comprising a threadlike structure with local thickenings which are located substantially above the water collection surface.

9. The plant aid according to claim 1, further comprising a reservoir for storing collected moisture.

10. The plant aid according to claim 1, wherein the collecting surface opens into a reservoir.

11. The plant aid according to claim 9, wherein the reservoir is located substantially below the water collection sheet.

12. The plant aid according to claim 9, wherein the reservoir is provided with an irrigation point for supplying moisture present in the reservoir to a subsoil located therebelow.

13. The plant aid according to claim 12, wherein the irrigation point comprises a dripper designed as a hollow needle.

14. The plant aid according to claim 12, wherein the irrigation point is provided with regulating means for regulating a flow of moisture to be supplied.

15. The plant aid according to claim 14, wherein the regulating means comprise a slidable plate for regulating the opening of the irrigation point.

16. The plant aid according to claim 15, wherein the regulating means further comprise a drive element for moving the slidable plate, wherein the drive element is provided with a calibration.

17. The plant aid according to claim 12, wherein the reservoir comprises an outflow channel of which a first end is operatively located above a bottom of the reservoir and of which a second end connects to the irrigation point.

18. The plant aid according to claim 1, wherein the top side of the water collection surface is provided with an adhesion-reducing cover layer.

19. The plant aid according to claim 1, wherein the water collection sheet is provided with thermal insulation material on its bottom side.

20. The plant aid according to claim 1, wherein the tube comprises two detachable wall parts.

21. The plant aid according to claim 1, further comprising a soil block located in the tube.

22. The plant aid according to claim 1, further comprising a graft shell for supplying organic substances to the young plant.

23. The plant aid according to claim 1, further comprising a substantially flat supporting structure for supporting the tube.

24. The plant aid according to claim 10, wherein the reservoir comprises an inlet pipe which, by a first end, inwardly connects to an edge of the opening in the water collection surface.

25. The plant aid according to claim 24, wherein a second end of the inlet pipe reaches to just above the bottom of the reservoir, whereby evaporation is minimized if even a small amount of moisture is present in the reservoir.

26. The plant aid according to claim 24, wherein the inlet pipe tapers in the direction of the first end.

27. The plant aid according to claim 9, wherein the reservoir further comprises an overflow pipe which, by a first end, inwardly connects to an edge of an overflow opening.

28. The plant aid according to claim 27, wherein a second end of the overflow pipe reaches to just above the bottom of the reservoir, whereby evaporation is minimized if even a small amount of moisture is present in the reservoir.

29. The plant aid according to claim 27, wherein the overflow pipe tapers in the direction of the first end.

30. A plant aid for protecting a young plant, comprising a tube at least partly sideways surrounding a young plant placeable in the plant aid, further comprising a water collection sheet for collecting moisture present in the atmosphere, wherein the water collection sheet is provided with a water collection surface comprising a receiving surface, which receiving surface operatively makes a first angle with respect to the orientation of gravity, and a collecting surface adjoining a lower edge of the receiving surface, which collecting surface operatively makes a second angle with respect to the orientation of gravity, wherein the first angle is smaller than the second angle, wherein the water collection surface is substantially funnel-shaped, and wherein the collecting surface has an inclination and comprises a radial extending channel section for guiding moisture drops to a lower part of the water collection sheet.

31. A plant aid for protecting a young plant, comprising a tube at least partly sideways surrounding a young plant placeable in the plant aid, further comprising a water collection sheet for collecting moisture present in the atmosphere, wherein the water collection sheet is provided with a water collection surface comprising a receiving surface, which receiving surface operatively makes a first angle with respect to the orientation of gravity, and a collecting surface adjoining a lower edge of the receiving surface, which collecting surface operatively makes a second angle with respect to the orientation of gravity, wherein the first angle is smaller than the second angle, wherein the water collection surface comprises a projecting structure which is operatively oriented substantially upwardly and wherein the surface of the projecting structure at least partly forms the receiving surface, and wherein the collecting surface has an inclination and comprises a radial extending channel section for guiding moisture drops to a lower part of the water collection sheet.

32. A plant aid for protecting a young plant, comprising a tube at least partly sideways surrounding a young plant placeable in the plant aid, further comprising a water collection sheet for collecting moisture present in the atmosphere, wherein the water collection sheet is provided with a water collection surface comprising a receiving surface, which receiving surface operatively makes a first angle with respect to the orientation of gravity, and a collecting surface adjoining a lower edge of the receiving surface, which collecting surface operatively makes a second angle with respect to the orientation of gravity, wherein the first angle is smaller than the second angle, wherein the water collection surface comprises a projecting structure which is operatively oriented substantially upwardly and wherein the surface of the projecting structure at least partly forms the receiving surface, wherein the collecting surface has an inclination and comprises a multiple number of radial extending channel sections for guiding moisture drops to a lower part of the water collection sheet, and wherein the projecting structure is located between two channel sections of the collecting surface.

33. A plant aid for protecting a young plant, comprising a tube at least partly sideways surrounding a young plant placeable in the plant aid, further comprising a water collection sheet for collecting moisture present in the atmosphere, wherein the water collection sheet is provided with a water collection surface comprising a receiving surface, which receiving surface operatively makes a first angle with respect to the orientation of gravity, and a collecting surface adjoining a lower edge of the receiving surface, which collecting surface operatively makes a second angle with respect to the orientation of gravity, wherein the first angle is smaller than the second angle, wherein the water collection surface comprises a projecting structure formed as radial extending rib which is operatively oriented substantially upwardly and wherein the surface of the projecting structure at least partly forms the receiving surface, wherein the collecting surface has an inclination and comprises a multiple number of radial extending channel sections for guiding moisture drops to a lower part of the water collection sheet.

\* \* \* \* \*